United States Patent
Jindal et al.

(10) Patent No.: US 9,379,837 B2
(45) Date of Patent: Jun. 28, 2016

(54) CHANNEL SHARING WITHIN WIRELESS COMMUNICATIONS

(71) Applicant: BROADCOM CORPORATION, Irvine, CA (US)

(72) Inventors: Nihar Jindal, San Francisco, CA (US); Yong Liu, Campbell, CA (US); Matthew James Fischer, Mountain View, CA (US); Ron Porat, San Diego, CA (US); Chiu Ngok Eric Wong, San Jose, CA (US); Vinko Erceg, Cardiff by the Sea, CA (US)

(73) Assignee: BROADCOM CORPORATION, Irvine, CA (US)

( * ) Notice: Subject to any disclaimer, the term of this patent is extended or adjusted under 35 U.S.C. 154(b) by 127 days.

(21) Appl. No.: 14/192,228

(22) Filed: Feb. 27, 2014

(65) Prior Publication Data

US 2014/0286203 A1    Sep. 25, 2014

Related U.S. Application Data

(60) Provisional application No. 61/804,718, filed on Mar. 24, 2013, provisional application No. 61/888,873, filed on Oct. 9, 2013, provisional application No. 61/936,158, filed on Feb. 5, 2014.

(51) Int. Cl.
| | |
|---|---|
| *H04W 4/00* | (2009.01) |
| *H04J 11/00* | (2006.01) |
| *H04W 16/14* | (2009.01) |
| *H04W 52/16* | (2009.01) |

(52) U.S. Cl.
CPC ........... *H04J 11/0026* (2013.01); *H04W 16/14* (2013.01); *H04W 52/16* (2013.01)

(58) Field of Classification Search
None
See application file for complete search history.

(56) References Cited

U.S. PATENT DOCUMENTS

| | | | |
|---|---|---|---|
| 2005/0141545 A1* | 6/2005 | Fein et al. | 370/445 |
| 2012/0008599 A1* | 1/2012 | Marin et al. | 370/336 |

OTHER PUBLICATIONS

Chen et al, On the Analysis of Efficient Hybrid MAC Protocol for Wireless Sensor Networks, IEEE, pp. 450-454, 2007.*

(Continued)

*Primary Examiner* — Frank Duong
(74) *Attorney, Agent, or Firm* — Garlick & Markison; Shayne X. Short

(57) ABSTRACT

A wireless communication device includes communication interface configured to receive and transmit signals and a processor configured to generate and process such signals. The communication interface of the wireless communication device is configured to receive a first signal from a first other wireless communication device, and the processor of the wireless communication device is configured to process the first signal to determine one or more concurrent transmission parameters. The processor of the wireless communication device is configured to generate the second signal based on the one or more concurrent transmission parameters and direct the communication interface to transmit the second signal to a second other wireless communication device during receipt of the first signal from the first other wireless communication device. The wireless communication device may be configured to make such concurrent transmissions based on one or more considerations such as the power level of the first signal.

20 Claims, 10 Drawing Sheets

(56) References Cited

OTHER PUBLICATIONS

Luo et al, CT-MAC: A MAC Protocol for Underwater MIMO Based Network Uplink Communications, ACM, 8 pages, 2012.*

Wang et al, A Concurrent Transmission MAC Protocol for Enhancing Throughout and Avoiding Spectrum Sensing in Cognitive Radio, IEEE, 6 pages, 2007.*

* cited by examiner

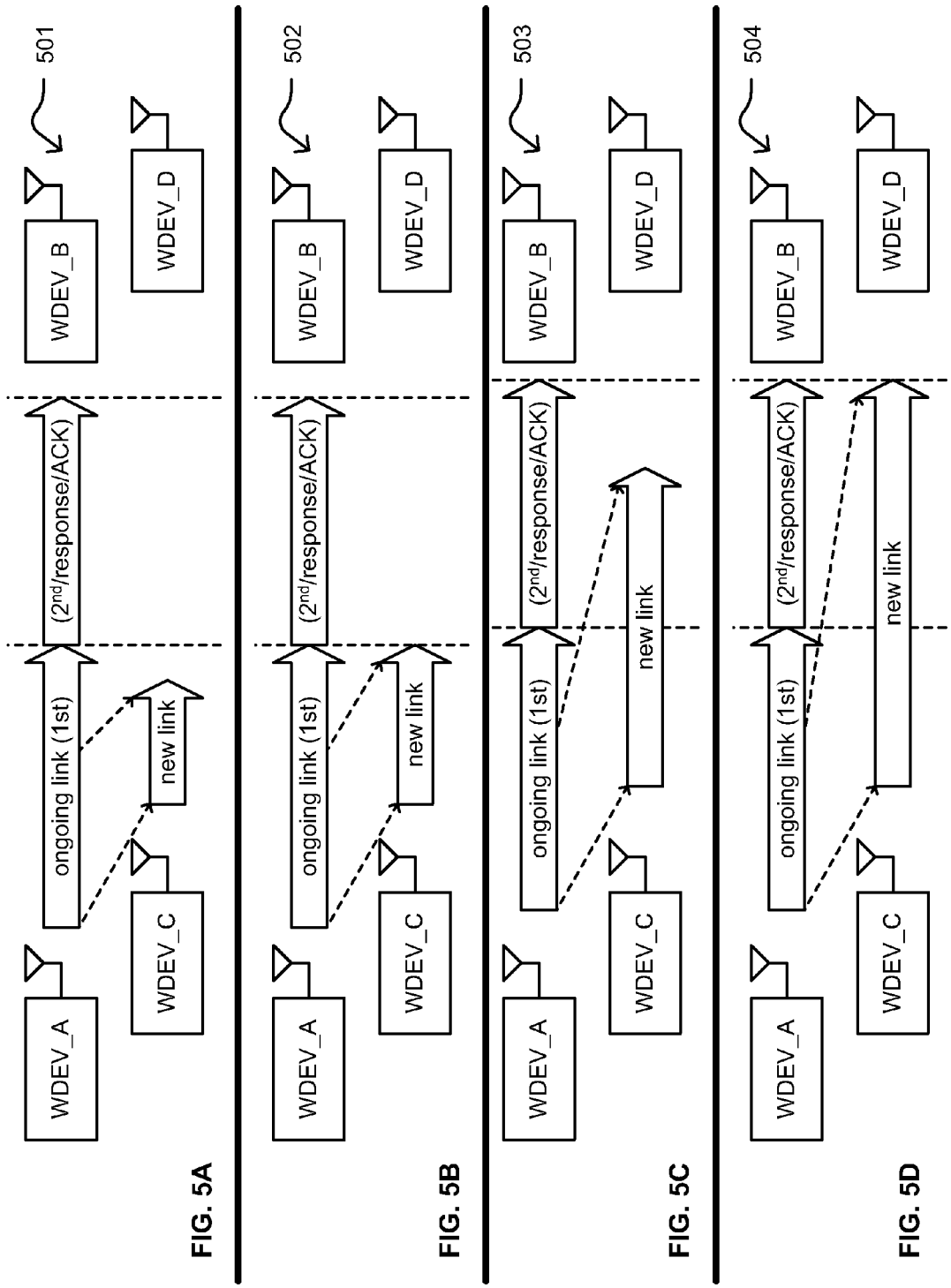

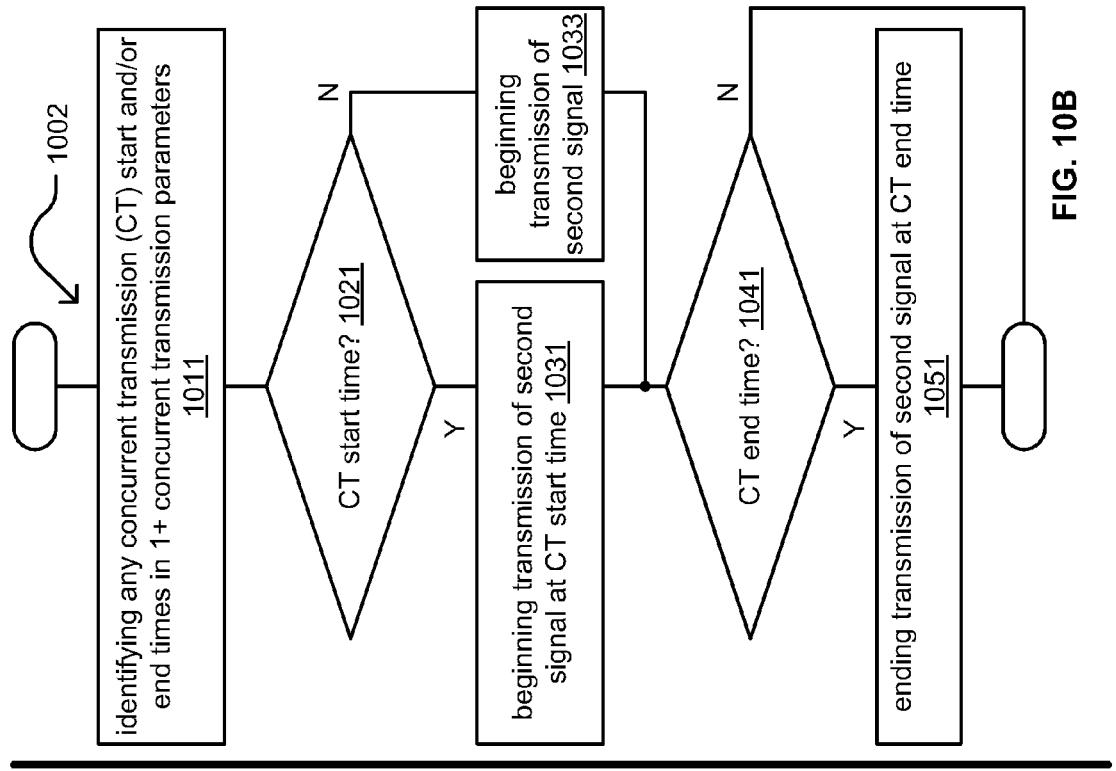
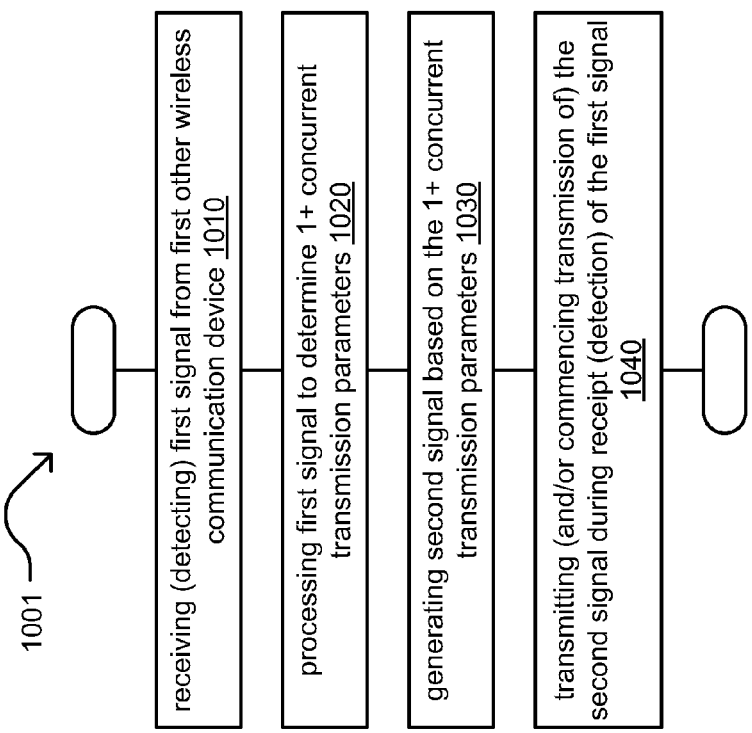
FIG. 10A
FIG. 10B

CHANNEL SHARING WITHIN WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to U.S. Provisional Application No. 61/804,718, entitled "Channel sharing within single user, multiple user, multiple access, and/or MIMO wireless communications," filed Mar. 24, 2013; 61/888,873, entitled "Channel sharing within wireless communications," filed Oct. 9, 2013; and U.S. Provisional Application No. 61/936,158, entitled "Channel sharing within wireless communications," filed Feb. 5, 2014, all of which are hereby incorporated herein by reference in their entirety and made part of the present U.S. Utility patent application for all purposes.

BACKGROUND

1. Technical Field

The present disclosure relates generally to communication systems; and, more particularly, to channel sharing and concurrent communications within single user, multiple user, multiple access, and/or MIMO wireless communications.

2. Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into RF signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Wireless communication systems generally operate such that only one wireless transmission is made at a time. For example, a wireless communication device will make a transmission to another wireless communication device only when no other wireless communications are being made. A device can avoid interference and loss of its transmissions by only making transmissions when no other devices transmitting. However, this operational constraint limits the amount of communication that may be made within the system. When only one device is allowed to transmit a time, all other devices remain idle and the overall throughput of the system suffers.

BRIEF DESCRIPTION OF THE SEVERAL VIEWS OF THE DRAWINGS

FIG. 5A is a diagram illustrating another example of communication between wireless communication devices.

FIG. 5B is a diagram illustrating another example of communication between wireless communication devices.

FIG. 5C is a diagram illustrating another example of communication between wireless communication devices.

FIG. 5D is a diagram illustrating another example of communication between wireless communication devices.

FIG. 10A is a diagram illustrating an embodiment of a method for execution by one or more wireless communication devices.

FIG. 10B is a diagram illustrating another embodiment of a method for execution by one or more wireless communication devices.

DETAILED DESCRIPTION

Figure 1:
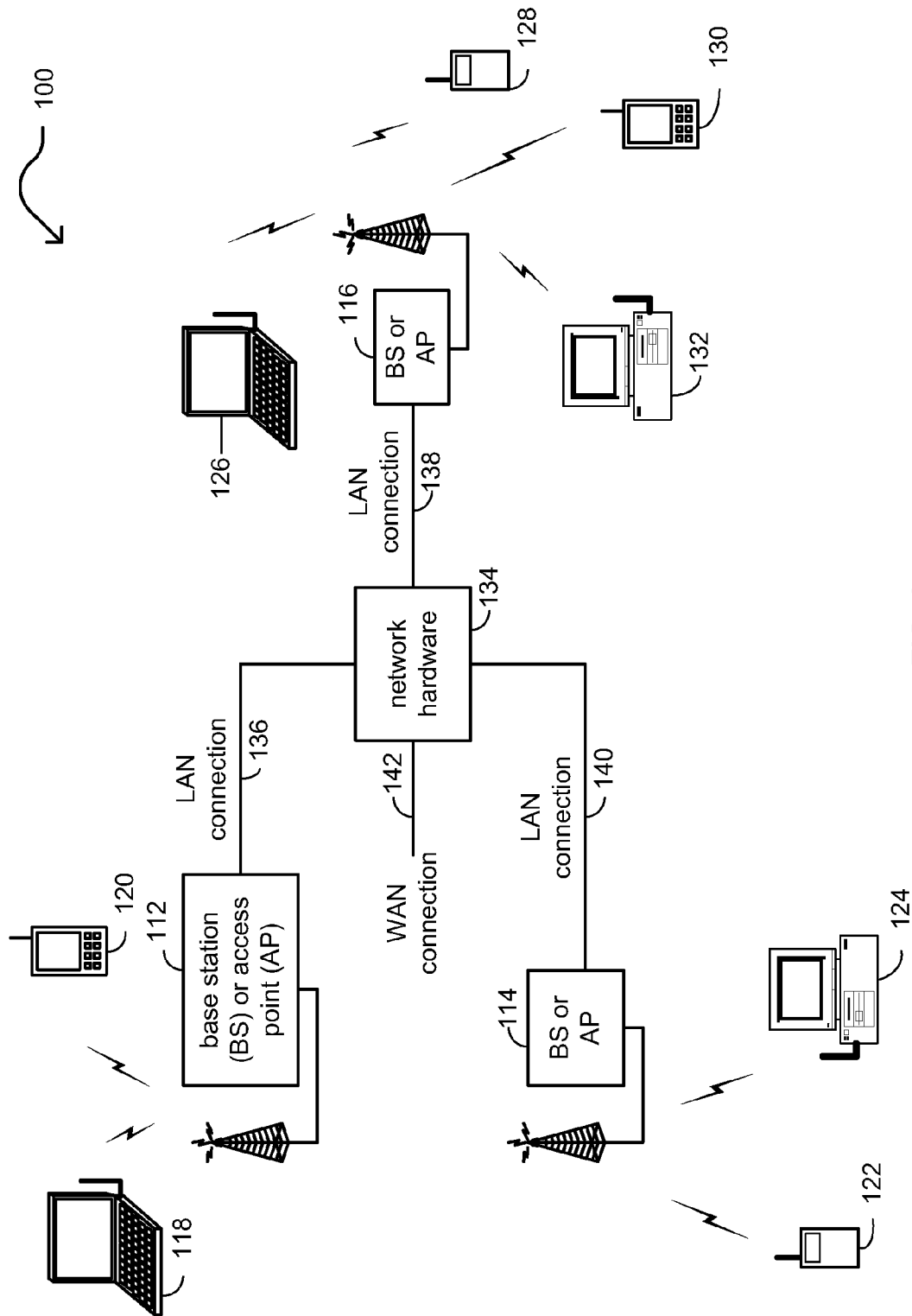
FIG. 1 is a diagram illustrating an embodiment of a wireless communication system.

FIG. 1 is a diagram illustrating one or more embodiments of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116.

In an example of operation, a processor implemented within one of the devices (e.g., any one of the WDEVs 118-132 and BSs or APs 112-116) is configured to process a first signal received from another one of the devices (e.g., any other one of the WDEVs 118-132 and BSs or APs 112-116) to determine one or more concurrent transmission parameters. The processor then generates a second signal based on those one or more concurrent transmission parameters and directs a communication interface of the device to transmit the second signal during receipt of the first signal. The first signal that is detected or received includes one or more concurrent transmission parameters therein. These one or more concurrent transmission parameters may be explicitly signaled within the first signal or determined implicitly based on one or more characteristics of the first signal. The communication interface of the device receives the first signal from a first other device, and transmits the second signal to a second other device.

The device is configured to transmit the second signal to the second other device during transmission of the first signal by the first other device. The one or more concurrent transmission parameters included within the first signal provide information by which the device can make the transmission of the second signal. Certain embodiments operate making a trade-off in terms of how much interference the first signal can tolerate in comparison to how much protection the second signal will need. The device may then begin transmitting the second signal during the time in which the first other device is transmitting the first signal based on the one or more concurrent transmission parameters.

Figure 2:
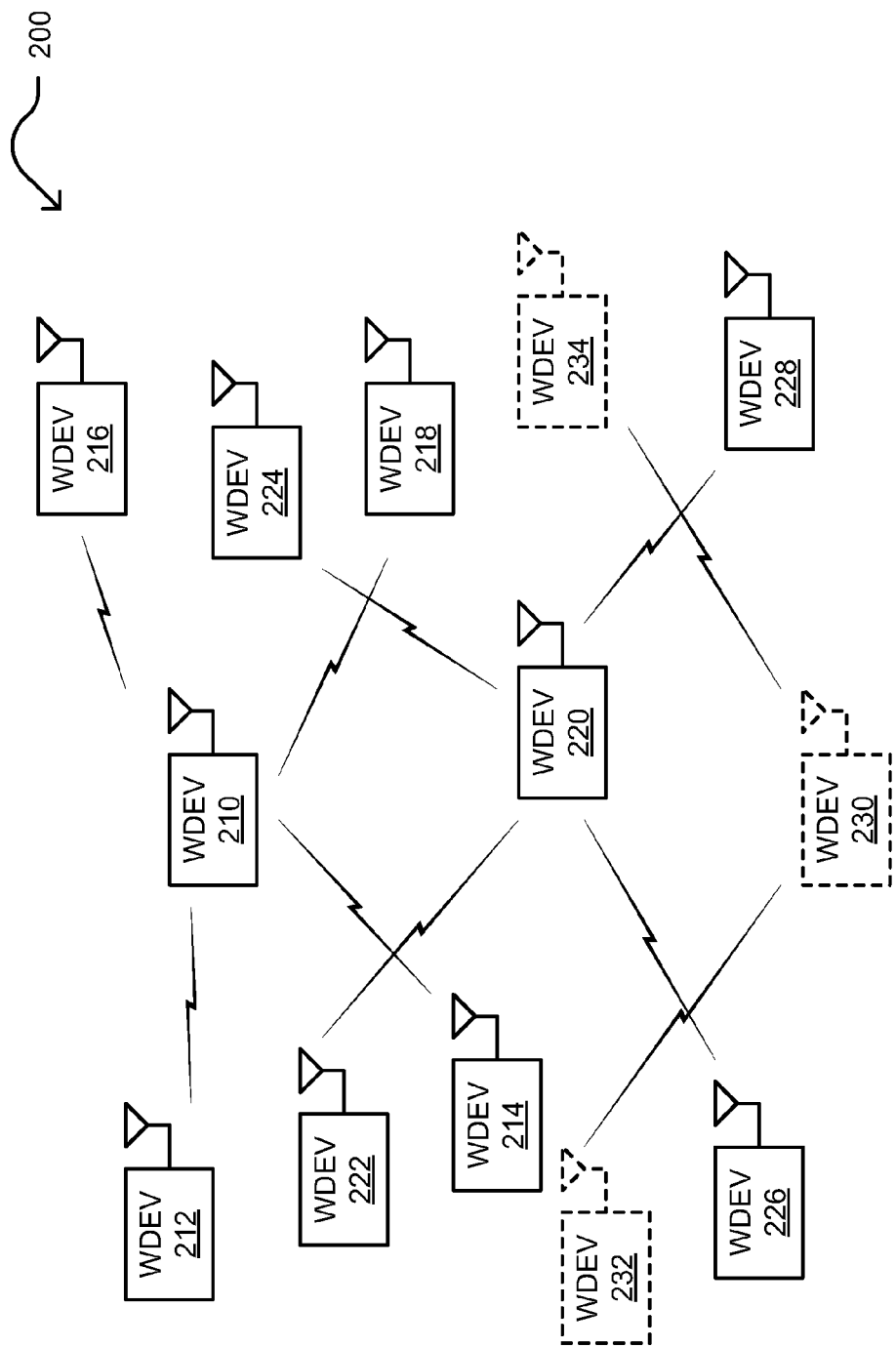
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, one or more additional APs or AP-operative STAs may be deployed, such as WDEV 230 that communicates with WDEVs 232 and 234 that are STAs. The STAs may be any type of wireless communication devices such as wireless communication devices 118-132, and the APs or AP-operative STAs may be any type of wireless communication devices such as BSs or APs 112-116. Different groups of the WDEVs 210-234 may be partitioned into different basic services sets (BSSs). In some instances, one or more of the WDEVs 210-234 are included within one or more overlapping basic services sets (OBSSs) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and AP are packed in a given area (e.g., which may be a relatively area [indoor or outdoor] with a high density of devices, such as a train station, airport, stadium, building, shopping mall, etc. to name just some examples). Large numbers of devices operating within a given area can be problematic if not impossible using prior technologies.

Within such wireless systems, communications may be made using orthogonal frequency division multiplexing (OFDM) and/or orthogonal frequency division multiple access (OFDMA) signaling. OFDM's modulation may be viewed a dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and frames. Typically, the frequency responses of these sub-carriers are non-overlapping and orthogonal. Each sub-carrier may be modulated using any of a variety of modulation coding techniques. Comparing OFDMA to OFDM, OFDMA is a multi-user version of the OFDM signaling scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users.

In the context of such a dense deployment of wireless communication devices, any one of the WDEVs 210-234 may be implemented to include a processor that is configured to process a first signal received from another one of the devices (e.g., any other one of the WDEVs 210-234) to determine one or more concurrent transmission parameters. Note that this first signal may be intended for a particular one of the WDEVs 210-234 and yet may be detected or received by one or more other of the WDEVs 210-234. The processor of a WDEV that may not be specifically designated as a recipient of the first signal then generates a second signal based on those one or more concurrent transmission parameters and directs a communication interface of the device to transmit the second signal during receipt of the first signal.

Examples of such concurrent transmission parameters may include information corresponding to at least one of a modulation type, a coding type, a modulation coding set (MCS), a transmit or receive power level, a duration of the first signal, a frame type of the first signal, uplink or downlink indication, an interference margin level, a basic services set (BSS) identifier, a transmitter or receiver identifier, a number of spatial streams, a number or transmitter or receiver antennae, symbol timing and carrier frequency offset, a concurrent transmission start time, a concurrent transmission end time, and a carrier sense threshold. Any one or more of these concurrent transmission parameters may be indicated explicitly within the first signal or determined by processing the first signal. For example, any one of the one or more concurrent transmission parameters may be determined implicitly by processing the first signal. The one or more concurrent transmission parameters may be characteristics or features of the first signal, and a device's processor may be configured to determine those parameters implicitly by analyzing the characteristics or features of the first signal.

Figure 3A:
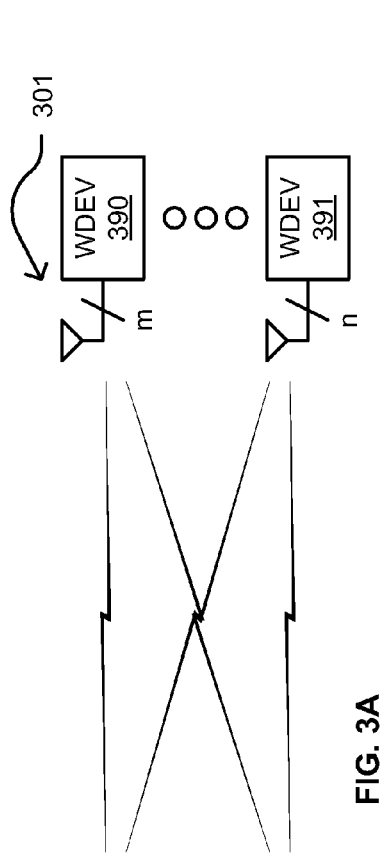
FIG. 3A is a diagram illustrating an example of communication between wireless communication devices.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of one or more frames (e.g., using a transmitter 322 and a receiver 324). The wireless communication device 310 also includes a processor 330, and an associated memory 340, to execute various operations including interpreting one or more frames transmitted to wireless communication device 390 and/or received from the wireless communication device 390 and/or wireless communication device 391. The wireless communication devices 310 and 390 may be implemented using one or more integrated circuits in accordance with any desired configuration or combination or components, modules, etc. within one or more integrated circuits. Also, the wireless communication devices 310, 390, and 391 may each include more than one antenna for transmitting and receiving of one or more frames (e.g., WDEV 390 may include m antennae, and WDEV 391 may include n antennae).

Figure 3B:
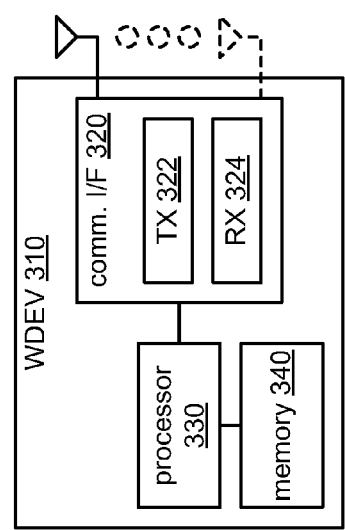
FIG. 3B is a diagram illustrating another example of communication between wireless communication devices.

FIG. 3B is a diagram illustrating another example 302 of communication between wireless communication devices. The communication interface 320 of WDEV 310 is configured to receive a first signal from a first other wireless communication device (e.g., WDEV 390). The processor of WDEV 310 is configured to process the first signal to determine one or more concurrent transmission parameters. Note that this first signal is intended for another wireless communication device (e.g., WDEV 391) and may be intended for WDEV 310. However, the WDEV 310 receives and/or detects the first signal based on the first signal's radiation pattern (e.g., radiating into a region that is detectable by the WDEV 310).

Figure 3C:
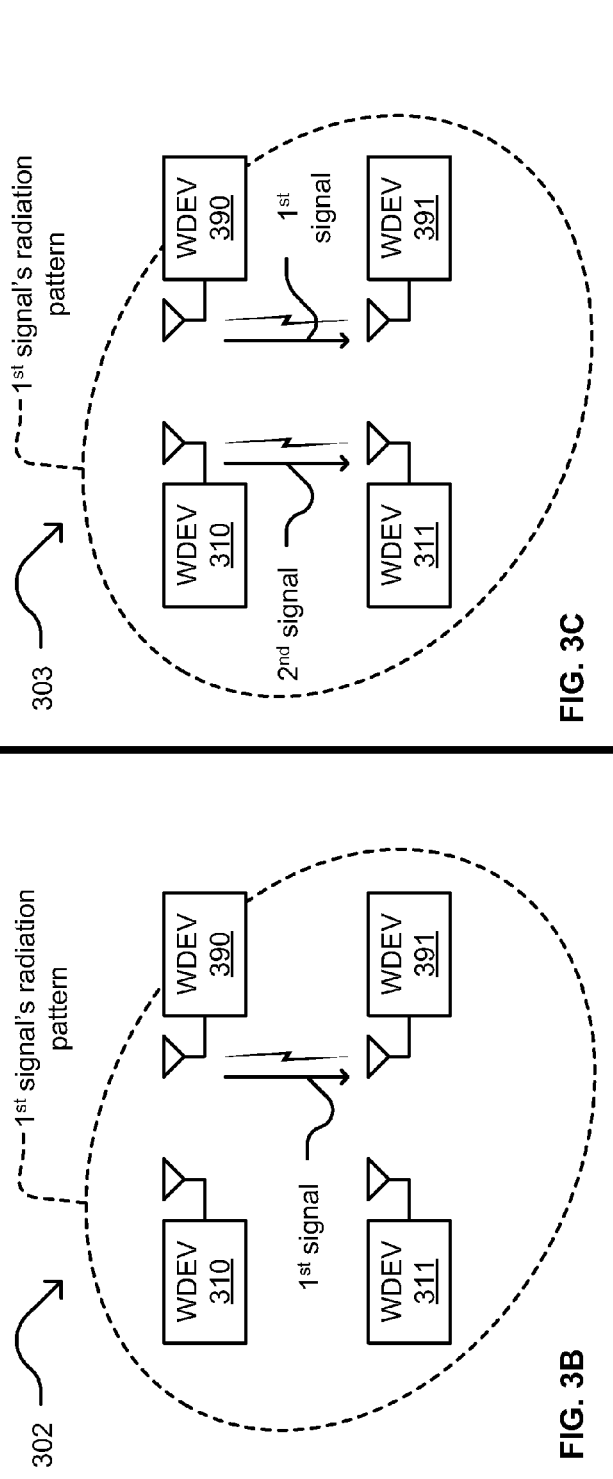
FIG. 3C is a diagram illustrating another example of communication between wireless communication devices.

FIG. 3C is a diagram illustrating another example 303 of communication between wireless communication devices. The WDEV 310 receives and/or detects the first signal based on the first signal's radiation pattern, and the processor of WDEV 310 is configured to generate the second signal based on the one or more concurrent transmission parameters and direct the communication interface 320 to begin or commence transmission of the second signal during receipt of the first signal from the first other wireless communication device (e.g., WDEV 390). For example, the communication interface 320 of WDEV 310 is configured to begin or commence transmission of the second signal to a second other wireless communication device (e.g., WDEV 311) during receipt and/or detection of the first signal being transmitted from the first other wireless communication device (e.g., WDEV 390).

With respect to operation of FIG. 3A and FIG. 3B, the device 310 is configured to begin transmission of the second signal to device 311 on top of or simultaneously with the transmission of the first signal from device 390 to device 391. The processor of device 310 may also be configured to determine when it is permissible to begin making such transmissions. For example, there may be one or more additional considerations that govern when a concurrent transmission may be made using the one or more concurrent transmission parameters determined based on the first signal transmitted from device 390.

Several of the following diagrams depict multiple wireless communication devices. Many examples include 4 separate wireless communication devices. These devices may be referred to as a first wireless communication device or wireless communication device A (WDEV_A), a second wireless communication device or wireless communication device B (WDEV_B), a third wireless communication device or wireless communication device C (WDEV_C), and a fourth wireless communication device or wireless communication device D (WDEV_D). Alternatively, for brevity, such a wireless communication device made be simply referred to as 'device' (e.g., as in device A, device B, device C, and device D).

This disclosure presents novel rules that allow concurrent transmissions to take place even while a device is hearing, receiving, and decoding other transmissions. This can increase WiFi aggregate throughput in a given area. While current WiFi communication standards, protocols, and recommended practices mandate a device that decodes a packet to stay silent for the duration of that packet, this disclosure presents the new methods that allow for more aggressive spatial reuse such that devices can simultaneously transmit if they do not interfere too strongly with each other.

Note that current IEEE 802.11 related standards, specifications, protocols, etc. disallow a $3^{rd}$ party device from transmitting on top of or during any packet which it receives at a power above specified thresholds. However, a device may be configured to perform selective transmission can be based on any or all of certain considerations. A device may be configured to perform observation of previous frames, such as by including levels at which it receives other frames (including frames addressed to other devices). A device may also be configured to use information extracted from frames, frame headers, and link setup frames, such as by that some such information already exists in current frame headers and RTS/CTS frames. Additional information may be included to be added to headers and/or other frames (e.g., such as indicating to which BSS a frame belongs to, the frame duration, etc.). Such rules may be fixed, or may be dynamically set by a given device (e.g., an AP) and other devices associated with it. The given device (e.g., AP) may observe interference conditions and determine an appropriate collision resolution signaling (CRS) threshold based on those observed interference conditions. This value may then be communicated from the AP to its associated STAs.

Figure 4A:
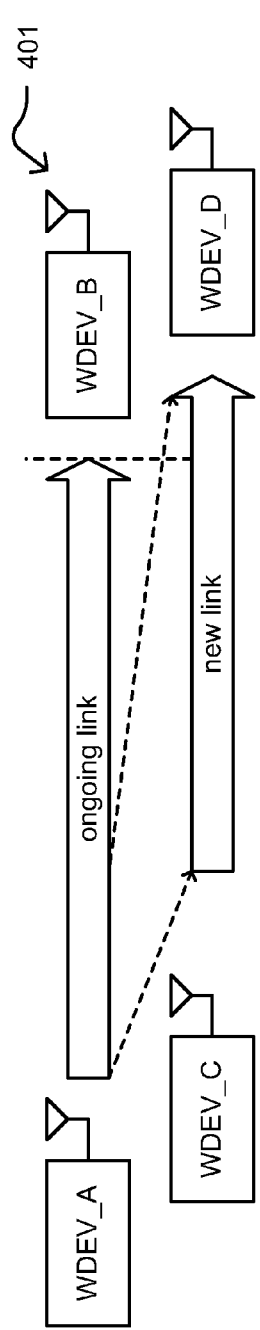
FIG. 4A is a diagram illustrating another example of communication between wireless communication devices.

FIG. 4A is a diagram illustrating another example 401 of communication between wireless communication devices. A begins transmitting a frame to B, and another device (e.g., C) decodes the header of A→B frame, and may have decoded prior frames sent by A and/or B (e.g., RTS/CTS preceding A→B data frame). Under current rules, if C successfully decodes A→B header, then C backs off for the duration of that frame. In some instances, an additional consideration may be made such that if C successfully decodes A→B header particularly at a power level above −82 dBm for 20 MHz transmission (e.g., the carrier sense (CRS) threshold), then C backs off for the duration of that frame. Novel mechanisms presented herein allow C to transmit on top of the ongoing A→B transmission under certain conditions.

Examples of concurrent transmission parameters may include one or more of the following: modulation coding set (MCS) of A→B link, interference margin of A→B: maximum interference level that B can accept while still being able to decode A→B frame, interference allowed/disallowed bit (e.g., if this bit is set and other conditions are satisfied, a nearby device may be allowed to transmit), CRS threshold, frame type (e.g., management vs. data frame), frame length, # of spatial streams in A→B streams, # of TX antennas at A, # of RX antennas at B, frame bandwidth, uplink vs. downlink indication, basic services set (BSS) identifier (ID), power at which B receives frames from A, transmit power, IDs of transmitting and/or receiving device, whether or not A→B frame will be acknowledged (e.g., ACK policy bits are already in MAC header, but may be replicated in PHY header), etc. Note that these listed concurrent transmission parameters are exemplary, and additional or different one or more concurrent transmission parameters may be used in different instances.

With respect to CRS threshold, an overhearing/listening/detecting device may be allowed to transmit on-top of A→B if the A→B frame and/or other A/B frames are received at a power level below this threshold. This threshold may be dynamically adjusted (e.g., on a per-frame basis or on a slower time scale) or could be fixed in a certain neighborhood or for a particular link. A device selecting a particular CRS threshold value may be required to satisfy certain rules in subsequent time periods, e.g., if device A transmits a frame with CRS threshold=−92 dBm, for a prescribed period of time after that device A may be required to use a CRS threshold less than or equal to −92 dBm when evaluating medium occupancy.

A BSS ID indicates to which BSS the frame belongs. A full BSSID could be sent, or a shorter, hash-function of the BSSID could be sent. Instead of sending full BSSID or a hash of BSSID, each BSS can choose one of a small set of colors to represent its ID, and bits associated with this color can be signaled. Messaging can be performed between nearby BSSs to make it likely that all BSSs within hearing distance of each other use different colors, so that their transmissions are distinguishable from one another. One possible use of such color bits is to use one set of rules for concurrent transmission when the color of the A→B transmission matches the color of device C, and another set of rules when the color is different. For example, if the color matches and the A→B header is successfully decoded, then no concurrent transmission is allowed; if the color does not match and the A→B header is successfully decoded and received at a power level below some threshold, then concurrent transmission is allowed. The premise of such an approach is that only a single transmission is typically possible within a single BSS.

The transmit power is that used by the transmitting station (e.g., device A). Broadcasting the transmit power of an ongoing transmission can allow other devices that overhear this transmission to determine the power level at which they will arrive at the transmitter of the ongoing link. If device A transmits a packet with power P_TX-A, device C receives that packet at power P_RX-C=P_TX-A−P_AC, where P_AC is the path loss (in dB) between A and C. The path loss between A-C and C-A is the same, so device A will receive a packet transmitted by device C with power P_TX-C at power level P_RX-A=P_TX-C−P_AC. Therefore, P_RX-A=P_RX-C+(P_TX-C−P_TX-A). Device C can measure P_RX-C when it receives a packet from A, device C knows P_TX-C, and device C can learn P_TX-A if it is signaled.

The IDs of transmitting and/or receiving device maybe contained in the MAC header of data frames, but these ID's or some reduced-bit hashed version of the ID's may also be added to the PHY header. Other information can also be embedded in A→B frame header or in prior A/B frames that can potentially be used by nearby devices to enable on-top transmission. With respect to duration, device A knows that, for the duration of its packet transmission, other devices can transmit because the recipient device B already reserved the channel via a CTS or a trigger/sync frame used (e.g., uplink (UL) orthogonal frequency division multiple access (OFDMA) or UL Multiple user (MU) transmissions). In this case device A only wants to protect the following ACK transmission from device B to device A and may then allow other transmission for the duration of the packet. The SIG in that case signals that transmissions are allowed only for the duration of the packet.

Such information described above could be conveyed in the physical layer (PHY) signal fields or in media access control (MAC) header fields using the standard encoding techniques, or could be conveyed by varying certain aspects of the PHY preamble. For example, a long training field (LTF) sequence could be modulated by one of N spreading codes, in order to convey $\log_2(N)$ bits of information. A receiver (RX) does not previously know which of the spreading sequences is used, so RX must process LTF and estimate which spreading sequence was used. This could be used for the BSSID "color" described above, or for any other information type. An additional cyclic redundancy check (CRC) may be added to the PHY payload covering only the MAC header, so that a decoding device can immediately determine whether or not it has decoded the MAC header correctly.

Also, different methods may be employed to incentivize A→B frame to set certain information fields to values that assist spatial reuse by nearby devices. If device A indicates a large interference margin in A→B frame, device A may be allowed to more aggressively transmit on top of other transmissions in a subsequent time period. Links that set the 'interfere with me' bit may be allowed to use a lower CRS threshold.

The A→B link may choose to use a deferred response to avoid high interference on the B→A link (e.g., due to C→D). For example, A may solicit response from B when A's medium becomes clear. Nearby devices may be allowed to interfere with A→B based on various consideration as follows: information values conveyed in A→B header and other A/B frames, power at which A→B header and other A/B frames are received (e.g., if C receives A→B header at power level below CRS threshold indicated in A→B header, C is in a different BSS than A, and no other interference conditions are specified in A→B header, then C can transmit (interfere)), rules broadcast by APs, and/or handshake agreements made between APs and/or devices.

Nearby devices may be allowed to interfere with A→B without conditions, or if their transmission meets prescribed conditions or compares favorably with some combination of the following parameters: transmit power, bandwidth (BW), # of spatial streams, and/or length.

For example, C decodes A→B header, and rules allow C to transmit a 20 MHz packet with 1 or 2 spatial streams with up to 10 dBm transmit power. In other scenarios C decodes A→B header and rules allow C to transmit a packet without any constraints.

Also, one or more concurrent transmission parameters may indicate that those devices that are allowed to transmit on top of A→B may be required to complete their frames before the end of the A→B frame. This will reduce interference to the B→A immediate response. The A→B packet duration may be signaled in the standard L-SIG symbol. Under certain conditions, these devices may be allowed to transmit beyond A→B frame (e.g., if device B is not going to send an immediate response, or if the on-top transmitter determines that it will not cause strong interference to A).

Rules for exactly when new interfering link (C→D in picture) must begin transmission may be specified (e.g., concurrent transmission start and/or end times), to allow device B to know when to expect interference. More than one possible start time may be allowed (e.g., immediately after PHY header, or 2 OFDM symbols later). An interferer (e.g., C) may also be required to exactly synch its symbol timing and carrier frequency offset to match A→B transmission. The A→B frame may contain some empty frames, to allow B to estimate the channel (C→B) and properties of interfering transmissions. The interferer (e.g., C) may be required to use a different LTF sequence from the A→B link so that B can differentiate the LTF coming from C from data symbols sent by A.

Generally speaking, a transmission begins from device A to B (e.g., from WDEV_A to WDEV_B). Communications described from A to B (or A→B) may be understood as being from WDEV_A to WDEV_B. Similar suffix conventions may be used as well (e.g., communications described from C to D may be understood as being from WDEV_C to WDEV_D, and so on). Nearby devices such as device C (and not devices A/B) will begin decoding the A→B signal (packet or frame), and these nearby devices may also have decoded frames that were optionally used to setup the A→B link (e.g., a request to send/clear to send (RTS/CTS) exchange). The setup frames and/or the headers (PHY & MAC) in the A→B frame contain information that allow such a nearby device to determine various things such as (a) how interference resilient the A→B frame is, and (b) how strongly this device will interfere with the A→B link if it begins transmitting. Some of this "information" will already be contained in standard frame headers and certain exchanged frames (e.g., RTS/CTS frames). Based on above information it has extracted from the A→B header and other frames, plus the power at which it received the A→B header and of other frames, a nearby device C may begin transmitting (on top of, i.e., simultaneously to, the A→B link) to another nearby device D, possibly subject to certain conditions.

A processor within device C may be configured to process the first signal to determine the one or more concurrent transmission parameters that includes a concurrent transmission start time. The information determined based on the first signal may indicate a particular time at which the device C should began its concurrent transmission. The processor within device C may then be configured direct the communication interface to transmit the second signal during receipt of the first signal and to begin transmission of the first signal based on the concurrent transmission start time. In some instances, the one or more concurrent transmission parameters may include a concurrent transmission end time that indicates when the concurrent transmission should end.

Figure 4B:
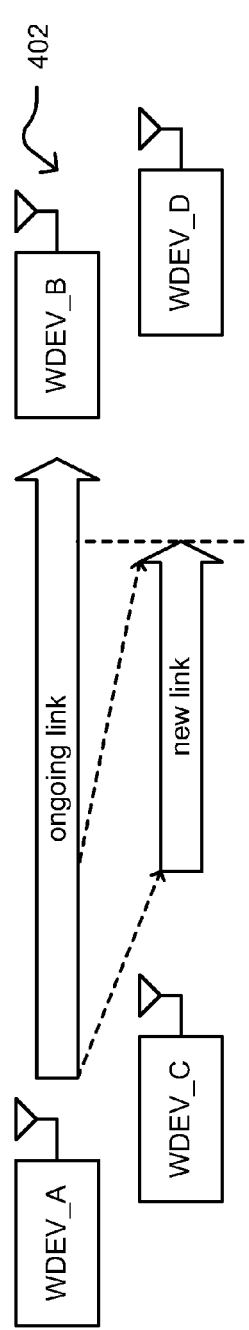
FIG. 4B is a diagram illustrating another example of communication between wireless communication devices.

FIG. 4B is a diagram illustrating another example 402 of communication between wireless communication devices. This diagram shows that the concurrent transmission from device C to D ends before the transmission from device A to B.

Figure 4C:
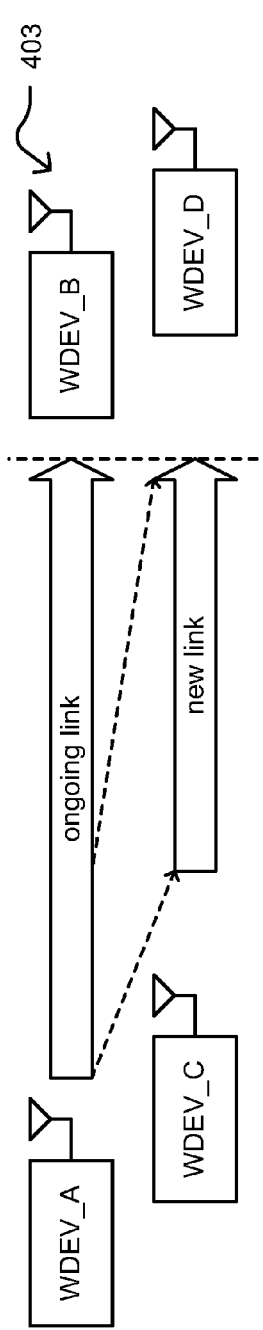
FIG. 4C is a diagram illustrating another example of communication between wireless communication devices.

FIG. 4C is a diagram illustrating another example 403 of communication between wireless communication devices. This diagram shows that the concurrent transmission from device C to D ends at the same time as the transmission from device A to B.

Referring back to FIG. 4A, that diagram shows that the concurrent transmission from device C to D ends after the transmission from device A to B. Concurrent transmission start and end times are just some examples of concurrent transmission parameters that may be determined based on the first signal transmitted from device A to B.

Transmission power considerations may also be made. For example, consider that device C overhears the A→B header and determines that if it transmits with 10 dBm power because such a transmission will cause negligible interference to A and B, and then device C may began a transmission to some other device D. In another example, consider that device C has previously reached an agreement with device A that allows C to transmit on top of any A transmission (e.g., such as during some prior frame exchange between those devices, such as an RTS/CTS frame exchange). Then, device C overhears A→B header, and device C is allowed to transmit based on this agreement, and thus C begins transmitting to D.

FIG. 5A-5D show examples where some response (e.g., an acknowledgement (ACK), a block acknowledgement (BACK), a reply, and/or any type of response) is expected after the first signal is transmitted from device A to B. Device C may process the first signal to determine that a response from B is expected during a time period that follows the transmission time of the first signal. These FIG. 5A-5D show just some examples of start and end times that the included within one or more concurrent transmission parameters determined based on a first signal is transmitted from device A to B.

FIG. 5A is a diagram illustrating another example 501 of communication between wireless communication devices. This diagram shows that the concurrent transmission from device C to D ends before the first transmission from device A to B and also ends before a response transmission from device B to A begins.

FIG. 5B is a diagram illustrating another example 502 of communication between wireless communication devices. This diagram shows that the concurrent transmission from device C to D ends at the same time as the first transmission from device A to B and also ends before a response transmission from device B to A begins.

FIG. 5C is a diagram illustrating another example 503 of communication between wireless communication devices. This diagram shows that the concurrent transmission from device C to D ends after the first transmission from device A to B and also ends before a response transmission from device B to A ends.

FIG. 5D is a diagram illustrating another example 504 of communication between wireless communication devices. This diagram shows that the concurrent transmission from device C to D ends after the first transmission from device A to B and also ends at the same time as a response transmission from device B to A ends.

Figure 6:
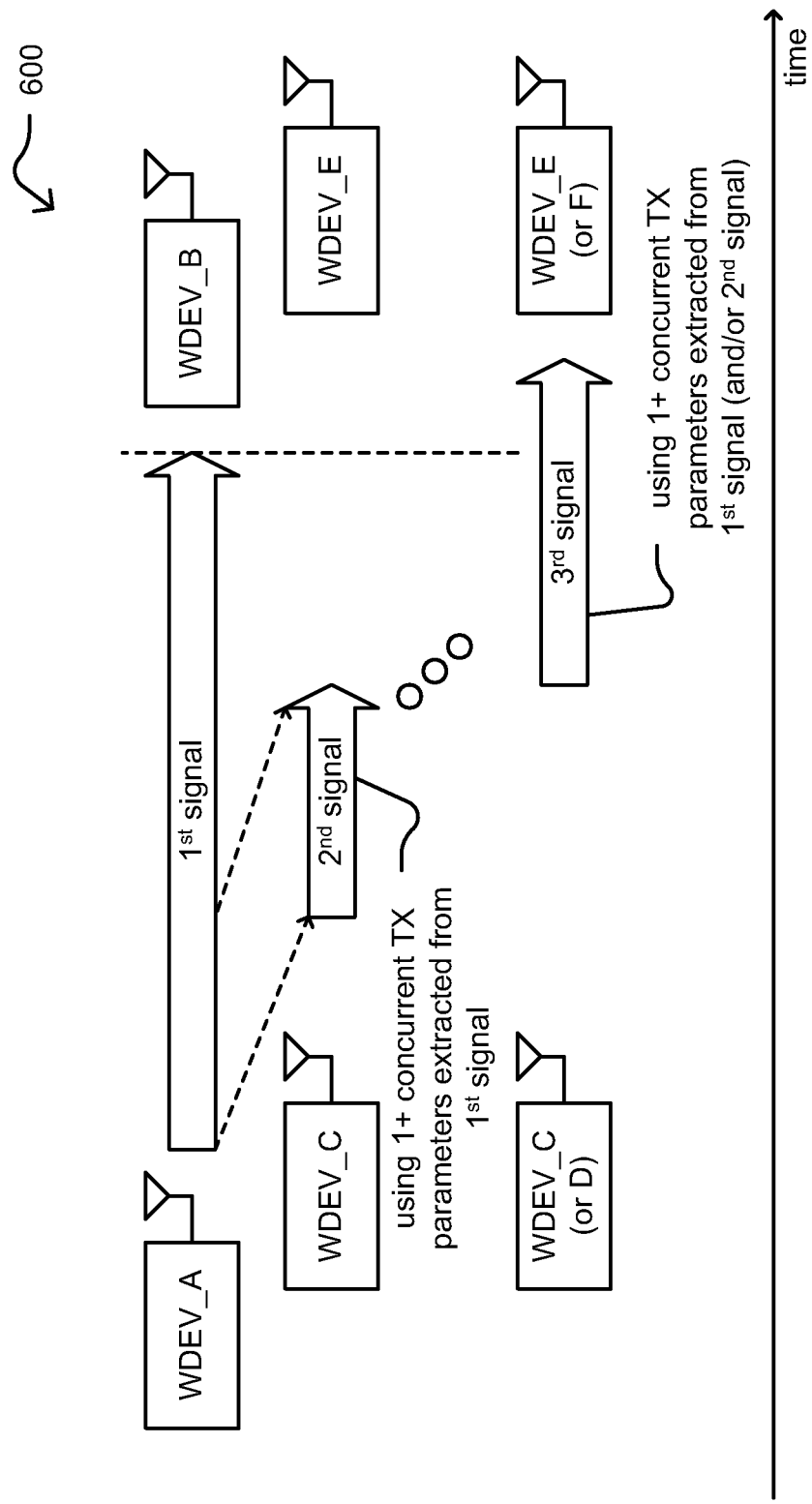
FIG. 6 is a diagram illustrating another example of communication between wireless communication devices.

FIG. 6 is a diagram illustrating another example 600 of communication between wireless communication devices. This diagram shows how device C uses a first one or more concurrent transmission parameters that are extracted from a first signal that is transmitted from device A to B. Device C then transmits a second signal to device E using those first one or more concurrent transmission parameters. Device C (or device D) may then transmit another one or more other signals using those same first one or more concurrent transition parameters, as shown up to a third signal transmitted from device C (or device D) to device E (or device F). Then, device C (or device D) may use a second one or more concurrent transmission parameters that are extracted from another detected/received signal that is transmitted from device A to B. Device C (or device D) may then transmit yet another one or more signals to device E (or device F) using those second one or more concurrent transmission parameters. In some instances, device C (or device D) may transmit one or more additional signals to device E (or device F) using those same second one or more concurrent transmission parameters that are extracted from the other signal that is transmitted from device A to B and detected/received by device C (or device D). This diagram shows how one or more concurrent transmission parameters may be used for one or more transmissions until a new one or more concurrent transmission parameters are determined.

Also, a device (e.g., device A) can be configured to decide to start a link using a spatial reuse sounding to check whether transmissions on A to B can coexist with other links in the neighborhood. Such a link spatial reuse sounding may be performed by A sending a sounding initialization frame to B. Then, B sends a sounding initialization response to A. A then sends a sounding frame/signal to B. Those devices (e.g., STAs) that receive B's sounding initialization response and that want to try spatial reuse can start a random backoff (e.g. backoff window proportional to B's signal strength). Once the backoff timer expires, a device (e.g., STA such as C) can start to send a sounding frame/signal to its peer STA (such as D) if the current medium condition is favorable to do so.

Note also that it is possible that more devices (STAs) may start to send a sounding frame/signal before A completes the transmission of its sounding frame/signal to B. B then continues to monitor the sounding signal from A as well as the add-on interferences from third-party devices. B may record the time point (e.g. duration from the start of A's sounding signal) when A's signal becomes unacceptable. Note also that all third party STAs need to stop transmissions before the end of A's sounding transmission.

Once A completes the sounding, B starts to send sounding frame/signal to A. B's sounding frame also indicates the devices allowed to share the link toward B (e.g. the STAs that send sounding signals within a certain time duration after A starts the sounding signal).

Those devices that receive A's previous transmissions and that are configured to try spatial reuse can start a random back off (again, with a backoff window proportional to A's signal strength), and, once the timers expire, those devices can send out sounding frame/signal to peer devices. A can record the time point when B's signal becomes unacceptable for such operations. Once B completes the sounding, A can broadcast a sounding report that indicates the devices allowed to share the link toward A (e.g. the STAs that send sounding signals within a certain duration after B starts to transmit sounding signal).

In some instances, a device (e.g., B) may have interference cancellation capability that enables that device to decode the intended signal received from a transmitter device (e.g., A) or part of it (e.g., in a hierarchical modulation or if multiple independently coded streams are used). This interference cancellation capability is based on the characteristics of the A→B transmission and on the capabilities of device B and may be implemented based on some or all of the following: device B has multiple antennas (e.g., can provide for better options to perform interference cancellation), device B has multiple-antenna based cancellation capability, device B has capability to perform maximum-likelihood (or similar) decoding on the signal and interfering signals, the A→B transmission uses a repetition mode (e.g. a DUP mode or MCS0 rep2 as defined in IEEE 802.11 ah), the A→B transmission uses hierarchical modulation, the A→B transmission uses multiple independently coded streams (e.g., note that the streams can be sent from different TX antennas or from the same antenna), and/or the A→B transmissions use hybrid automatic repeat request (HARM). Interference cancellation-specific information can be signaled in the A→B header and earlier setup frames.

Also, in some instances, some devices (e.g., A and C) can exchange special management frames to negotiate conditions for simultaneous and concurrent transmission. This may be performed using a special type of handshake and that includes rules specific to such a handshake. For example, the handshake may operate to allow simultaneous transmission under all conditions (e.g., such that device C is allowed to ignore all frames sent by A from the perspective of channel access). The handshake may operate to negotiate to allow simultaneous transmission under more specific conditions (e.g., C is allowed to ignore frames sent by A to B from the perspective of channel access, or C can ignore frames sent by A above a certain MCS).

This process can be performed between specific devices, or between entire BSS's. In the case of BSS negotiation, the corresponding APs may exchange management frames and come to an agreement. This agreement is then broadcast the agreement parameters to all devices (e.g., STAs) in their BSS. Also, the devices may form agreements based on the interference conditions observed during operation. APs can request their associated STAs to provide them with a report on observed interference levels, and can use this information to set BSS channel access policies.

Note that while various options have been provided above to enable a second link to operate on top of an ongoing transmission, certain considerations can be made when multiple such links (e.g., more than one concurrent transmissions) begin transmitting on top of an ongoing transmission. For example, considerations may be made based on any resulting higher aggregate interference to the ongoing transmission, and any interference to each other. For example, if an A→B transmission is ongoing, devices C and E both detect A→B and then may decide to begin new transmissions (C→D and E→F) at the same time. Various operations may be performed to prevent multiple interferers from simultaneously transmitting on top of A→B. For example, a mechanism may be used to makes it more likely that only a single interfering communication (e.g., device C) will begin immediately. Other potential interfering devices will hear that an interferer has already begun and will not begin unless they determine that they will not interfere strongly with both of the ongoing links (e.g., both A→B and C→D).

If desired, a randomization mechanism can be used to stagger concurrent transmissions. If devices C and E decide to transmit, each device then draws a random backoff time. When a device's backoff time expires, that device senses the channel and begins to transmit if it detects sufficiently low power to do so. Note that the backoff window can be proportional to detected B's and/or A's signals. Backoff windows may be chosen inversely proportionally to the level at which the A→B frame (and other frames, e.g., RTS/CTS) is heard. This can give more priority to a device that hears A and/or B at a very low power level. Alternatively, devices can continue an existing enhanced distributed channel access (EDCA) backoff timer after they have determined that they are allowed to transmit on top of A→B.

In yet another approach, token passing may be used to prioritize different links at different times. For example, only those devices with the token may be allowed to begin a concurrent transmission on top of an ongoing transmission. The token could be locally distributed (e.g., passed between BSS's or between devices, or be broadcast by the AP).

In some other instances, an A→B frame header could contain instructions on how any such randomization is to be performed. For example, a backoff window could be specified, or a random number could be specified which determines the priority of third party devices.

An interference management entity (e.g., another device or AP) may be implemented that grants permission to other devices that are allowed to transmit on top of an ongoing transmission. For example, a management entity (covering multiple BSS's) could also be allowed to schedule transmissions, e.g., STAs/APs make scheduling requests to this entity, which then comes up with a schedule that is distributed to all BSS's within its control.

Device A can establish a link to B via a RTS/CTS exchange, followed by DATA transmission. A possible modification of current RTS/CTS rules may be as follows: if C hears the RTS from A, but does not hear the CTS from B, and then hears the following A→B frame that follows, then C may interfere with A→B. Data frames that are preceded by an RTS/CTS exchange can provide additional information to nearby devices, compared to the information contained only in the headers of the A→B data frame. The A→B frame is transmitted by A and allow nearby devices to determine how strongly they interfere with device A (but not necessarily B). In this case, the CTS frame is transmitted by B and thus allows nearby devices to determine their interference level at B (e.g., the device that will be the recipient of A→B frame). Other devices can make a transmission decision based on information from the RTS/CTS exchange and/or the A-B frame header. Interfering transmission may be allowed to start at the same time as A→B frame (SIPS after CTS sent by B), or may be required to start after A→B data frame.

Additional information can be added to the CTS frame (and/or RTS frame) to allow for better channel sharing. For example, a MCS recommendation may be included for the DATA frame. Also, different transmit powers may be used for RTS and CTS. As an example, when device B receives the RTS, B uses information in the RTS (e.g. MCS for DATA frame) to determine available interference margin for the next DATA frame. If interference margin is high, B sends CTS at a lower transmit power to allow higher spatial reuse around B. If interference margin is low, B sends CTS at a higher transmit power to protect the frame reception at B and prohibit spatial reuse around B.

Also, an extended RTS/CTS handshake mechanism may be used that allows RX devices to pre-measure the interference power and feed back to its transmission an MCS recommendation that accounts for this interference.

Figure 7:
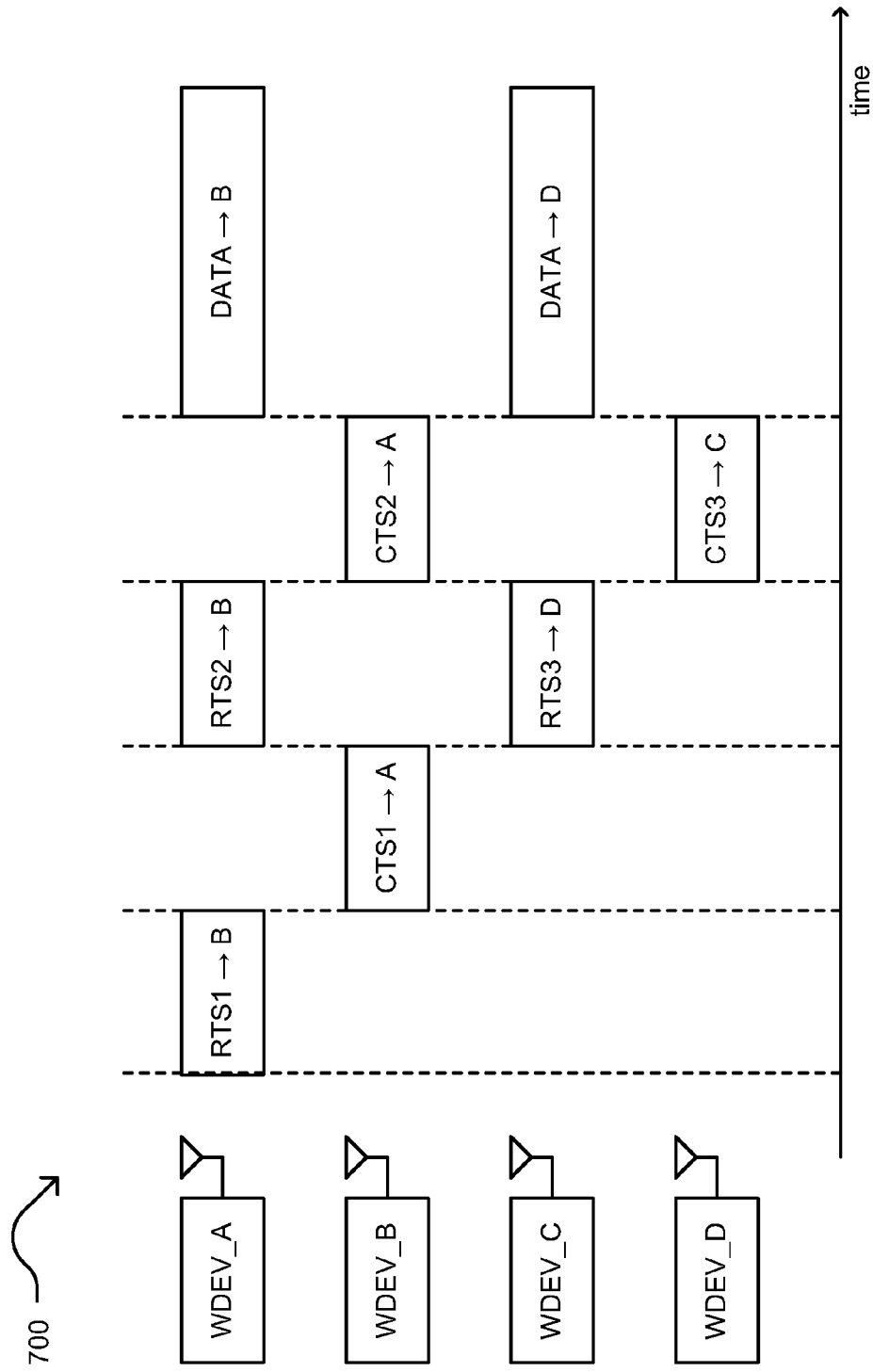
FIG. 7 is a diagram illustrating another example of communication between wireless communication devices.

FIG. 7 is a diagram illustrating another example 700 of communication between wireless communication devices. The steps of this extended RTS/CTS handshake mechanism of FIG. 7 are described as follows:

1. A sends RTS1 to B.
2. B responds with CTS1 to A. CTS1 (and/or RTS1) indicates that this is an extended RTS/CTS handshake, and so other devices may attempt to contend during the next 2 steps, pursuant to conditions (e.g., if initial RTS/CTS heard at sufficiently low power level).
3. A sends second stage RTS (RTS2) to B. C simultaneously sends RTS3 to D. Device B receives RTS2 in the presence of interference from RTS3, and determines the maximum MCS decodable in the presence of that interference. D simultaneously performs this process.
4. B sends CTS2 to A, which includes the maximum MCS it can handle in the presence of interference from C. D sends CTS3 to C, including the maximum MCS it can handle in the presence of interference from A.
5. A and C simultaneously transmit their data packets.

An additional extension to this extended RTS/CTS handshake mechanism may be used that allows A/B, the initial pair, to reject interfering pairs (e.g., reject the pairing of C and D). In such a modification, Step 4 above may be broken into 2 steps, 4(a) and 4(b) below that may be partially overlapping, and 4(a) may begin earlier than short interframe space (SIPS) after previous step.

4(a): Only B transmits CTS2 to A. CTS2 can contain a message which tells C and D to not continue transmission.

4(b): If rejection message is not received by D, D transmits CTS3 to C.

If C received rejection message in 4(a), then C ignores CTS3 from D and does not transmit data to D.

The handshake described above and shown in the diagram may be modified by skipping Step 2. Also, this above procedure can be used to initialize simultaneous transmission, but does not have to be repeated for every frame. If above sequence is successful once, for a later exchange A/B can use a normal 2-step RTS/CTS handshake which signals that simultaneous transmission by C (or whoever joined previous A/B exchange) is allowed.

Figure 8:
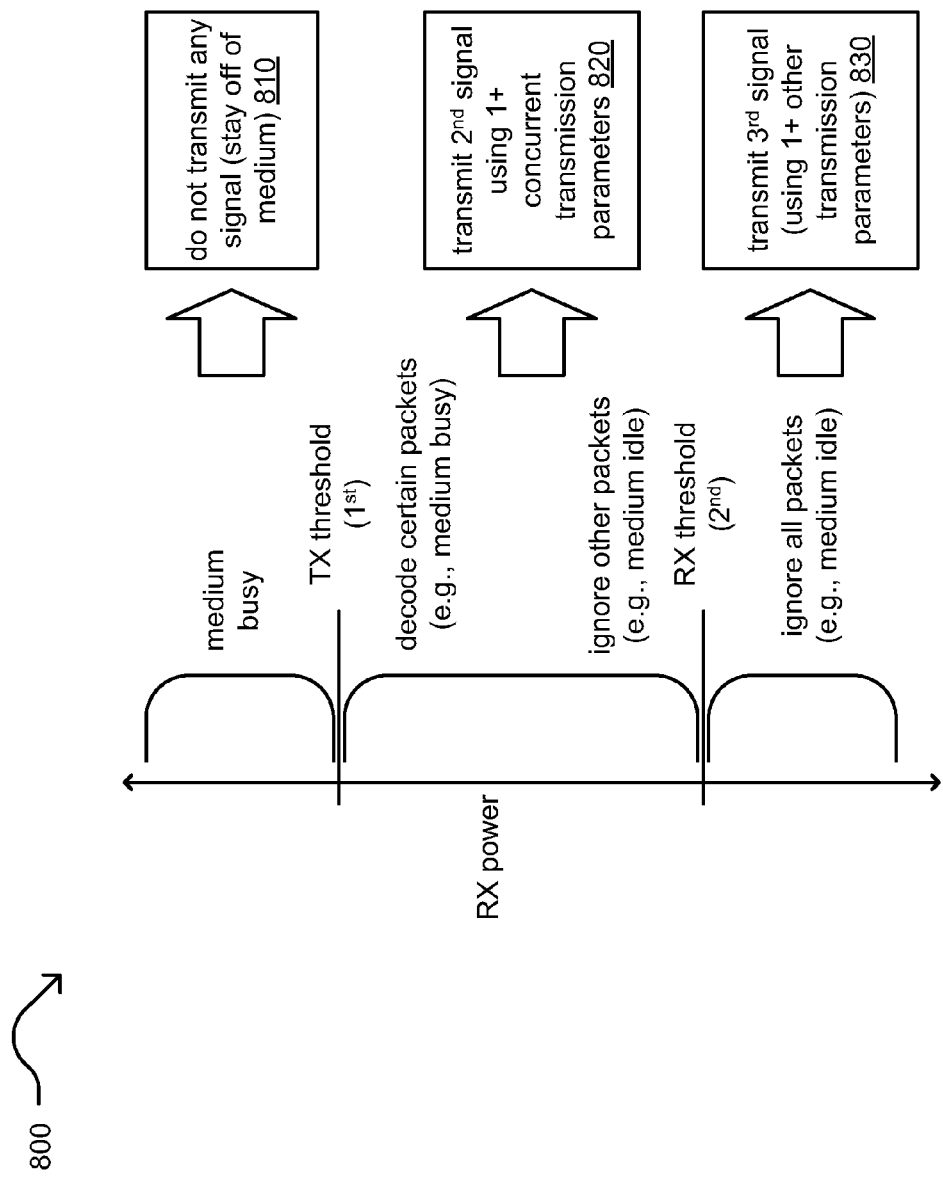
FIG. 8 is a diagram illustrating an example of selective operation of a wireless communication device based on power level of a received signal.

FIG. 8 is a diagram illustrating an example of selective operation 800 of a wireless communication device based on power level of a received signal. A device may modify (e.g., increase or decrease) a carrier sense (CRS) threshold used to identify communications and selectively apply certain concurrent transmission parameter or rules when the power compares favorably with one or more considerations. A device may be configured to use two thresholds: a first or transmitter (TX) threshold and a second or receiver (RX) threshold (e.g., where TX threshold≥RX threshold). The device is configured to ignore all packets below the RX threshold, and the device may make transmissions using one or more transmission parameters that need not specifically be concurrent transmission parameters (e.g., may be transmission parameters not specifically used for concurrent transmissions). A device ignores a packet and considers the medium as idle (e.g., backoff continues), and the device can transmit simultaneously on top of an ignored packet without restrictions (block 830).

With respect to all packets that are above TX threshold, the device considers the medium as busy and simultaneous transmissions are not allowed (block 810). For an example of operation, when the power is above the TX threshold, the device delays commencing transmission of any signals until the power is detected as being below the TX threshold (e.g., after some period of time after which the power is detected as being within an acceptable level for commencing transmission of the signal). With respect to all packets that are between the two thresholds (block 820), the device can selectively decode certain (e.g., "interesting") packets using one or more concurrent transmission parameters when the medium is counted as busy and ignore all other packets when the medium is counted as idle (e.g., backoff continues), and the device can again transmit simultaneously on top of an ignored packet. These "interesting" packets may be characterized as fitting within any/all of below categories: packets intended for this device (unicast or broadcast), any packet in the same BSS, control frames, from this or other BSS's, etc.

The current IEEE 802.11 related standards, specifications, protocols, etc. defines a universal TX CRS threshold (=RX threshold) for all STAs. However, devices may be configured to allow more flexible CRS threshold setting. A BSS with all/most member devices that are tolerable to OBSS interference can set a higher TX CRS threshold.

An AP can estimate all uplink and downlink signal/noise/interference conditions (and/or have STAs report downlink signal/noise/interference conditions) to decide whether it is beneficial to raise the TX CRS threshold for the whole BSS and how much the threshold should be increased. The AP can announce the BSS-wide TX CRS threshold in beacon. STAs can decide whether to join the BSS based on the TX CRS threshold. An AP can also divide STAs to multiple groups based on their signal to interference noise ratio (SINR) conditions, and assign a different TX CRS threshold to a different group.

An AP can also assign a TX CRS threshold to each individual STA. A STA may also request a higher TX CRS threshold first, and the AP decides to approve the request or reject it. AP can use the max TX CRS threshold assigned to the STAs or set its TX CRS threshold equal to the energy detection threshold (e.g. −62 dBm). A universal energy detection threshold (e.g. −62 dBm) may be defined for all STAs and also serve as the upper limit for TX CRS threshold.

With respect to raising the TX CRS threshold, note that while STAs with high TX CRS threshold enjoy the benefit of transmitting on top of OBSS's transmissions, they cause continuous interferences to OBSS's medium, which may not be acceptable to some OBSS STAs. Note that raising the RX CRS threshold may affect a STA's reachability to some degree. STAs using high RX CRS threshold will be blind from weak signals, including weak protection frames like RTS/CTS. The OBSS STAs suffering from the high-CRS-threshold STAs' transmissions have no way to stop the interferences.

A STA with a weak link may be configured to provide protection of its transmissions from other STAs that raise their respective TX/RX CRS threshold. Control protection frames like RTS/CTS (or special RTS/CTS) should be honored with low/minimum TX/RX CRS threshold, so that a receiver device needs to check the decoded frame (in PHY and/or MAC header) to decide if this frame's power must be compared against a special protection threshold. Frames needing extra protection could be signaled in the MAC header, or via some modification to the PHY preamble, e.g., to the L-STF or L-LTF or L-SIG.

Also, a BSS or a STA that increases its TX CRS threshold should periodically lower its TX CRS threshold or disable transmission for a sufficient duration to allow STAs with weak links to participate. For example, an AP may require that all STAs with high TX CRS threshold to use low TX CRS threshold or stop transmission for a particular duration after a special signaling frame (e.g. using a special beacon). Scheduling of high threshold vs. low threshold periods may be coordinated between neighboring BSS's, so that some fraction of time in an area is reserved for high threshold use (aggressive spatial ruse, high interference) while the rest of time is reserved for low threshold use (e.g., providing less reuse but with lower interference). This scheduling could be in time-domain and/or frequency domain (e.g., a certain 20 MHz sub-band is periodically reserved for low threshold use).

Note that an AP may be configured to use a minimum RX CRS threshold and try to process all decodable signals. This will ensure that the AP can receive and decode the protection frames or inter-BSS negotiation frames. The AP may then ignore other frames with a low power level, and a STA may use a high RX CRS threshold to ignore any low power signal.

When an AP/STA detects a persistent interference from an OBSS that blocks its transmission/receiving, that AP/STA may send a protection frame or CRS negotiation frame to the AP of the BSS that generates the interference, and the AP/STA can request the interfering BSS to lower the TX CRS threshold for a certain duration or lower the TX CRS threshold forever. For example, the AP/STA that suffers from the interference may send an RTS to the AP of the interfering BSS, and the intended AP needs to send a CTS to silence its BSS for a duration set in the RTS. The AP/STA that suffers from the interference may also send a CRS/interference reduction management frame to the AP of the interfering BSS and request the intended AP to reduce its BSS's TX CRS level, or reduce TX power to reduce interference. Protection frames and inter-BSS CRS/interference negotiation frames may be allowed to be transmitted with high TX power and/or narrower bandwidth to ensure their reachability to OBSS APs.

In another implementation, a STA that is configured to use a high TX CRS threshold may operate by reducing its TX power. Different TX CRS thresholds can be mapped to different TX powers. Some important management and control frames (e.g., beacons, RTS/CTS etc.) may be allowed to be transmitted using the maximum allowed TX power. If an AP assigns multiple TX CRS thresholds within its BSS, the AP shall adjust the downlink TX power based on the receiving STA's TX CRS threshold.

Figure 9:
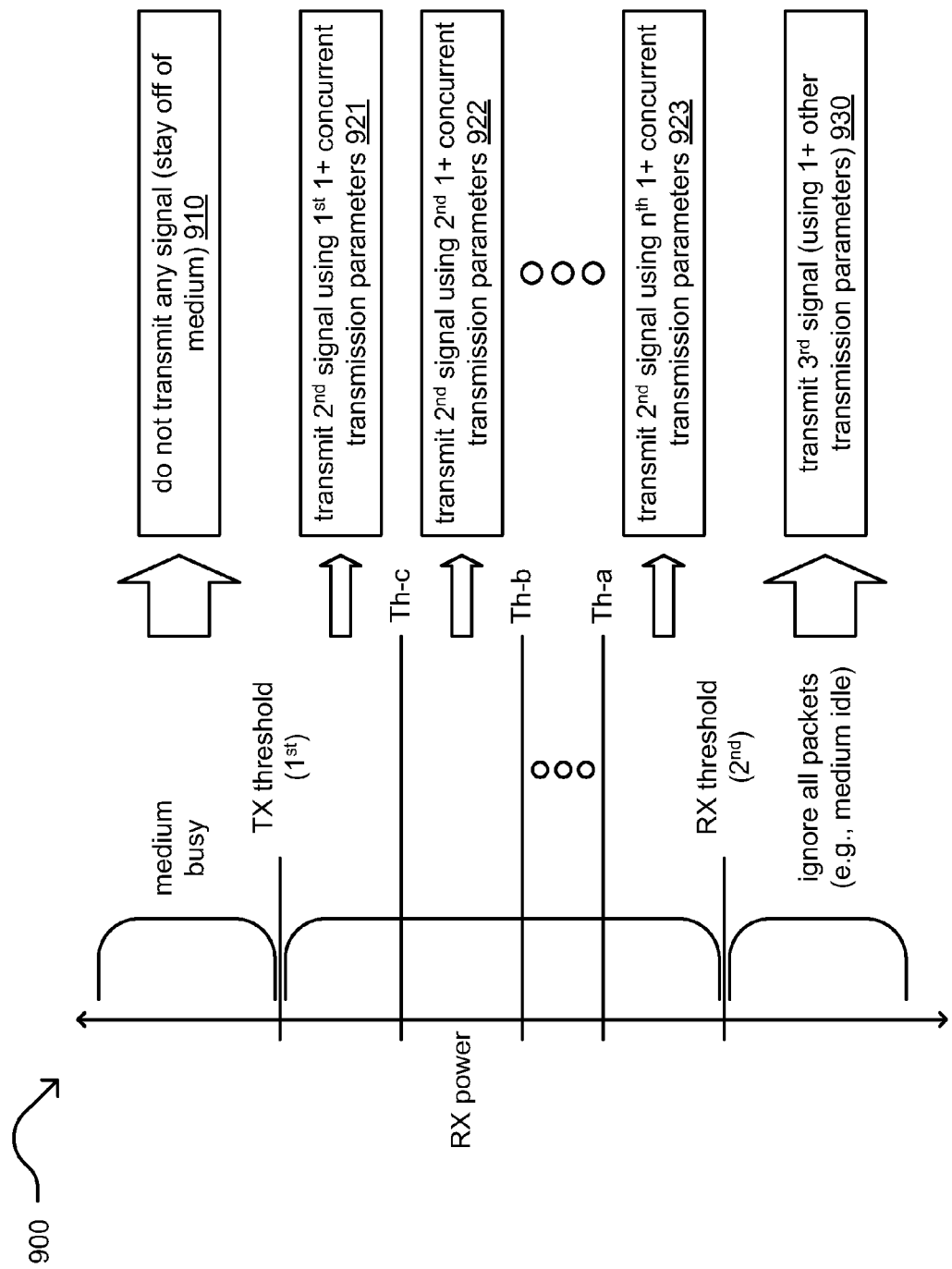
FIG. 9 is a diagram illustrating another example of selective operation of a wireless communication device based on power level of a received signal.

FIG. 9 is a diagram illustrating another example of selective operation 900 of a wireless communication device based on power level of a received signal. This diagram shows an alternative selective operation in which multiple thresholds are used between the two thresholds of the first or transmitter (TX) threshold and the second or receiver (RX) threshold (e.g., where TX thresh≥RX thresh). With respect to all packets that are above the first or transmitter (TX) threshold, the device considers the medium as busy and simultaneous transmissions are not allowed (block 910), and the device is configured to ignore all packets below the second or receiver (RX) threshold such that the device can transmit simultaneously on top of an ignored packet without restrictions (block 930) without restriction using desired transmission parameters.

However, in between the TX and RX thresholds, the device is configured selectively to apply different rules and perform different operations depending on where the power level of the received signal lies between the TX and RX thresholds. When the power level is between the TX threshold and an upper threshold in the range between the TX and RX thresholds, TH-c, then the device is configured to transmit the second signal using first one or more one or more concurrent transmission parameters. When the power level is between the TH-c and TH-b thresholds, then the device is configured to transmit the second signal using second one or more one or more concurrent transmission parameters. This selective operation of applying different rules and performing different operations may be made for a number of different sub-ranges between the TX and RX thresholds. When the power level is between the TH-b and TH-a thresholds, then the device is configured to transmit the second signal using n-th one or more one or more concurrent transmission parameters.

FIG. 10A is a diagram illustrating an embodiment of a method 1001 for execution by one or more wireless communication devices. The method 1001 begins by receiving a first signal from a first other wireless communication device (e.g., via a communication interface of a wireless communication device) (block 1010). The method 1001 continues by processing the first signal to determine one or more concurrent transmission parameters (block 1020). The method 1001 then operates by generating a second signal based on the one or more concurrent transmission parameters (block 1030). The method 1001 continues by transmitting the second signal during receipt of the first signal (e.g., via the communication interface of the wireless communication device) (block 1040).

FIG. 10B is a diagram illustrating another embodiment of a method 1002 for execution by one or more wireless communication devices. The method 1002 begins by identifying any concurrent transmission (CT) start and/or end time included within one or more concurrent transmission parameters (block 1011). If no CT start time is detected (block 1021), then the method 1002 operates by beginning transmission of a second signal at any desired time (block 1033) and continues to block 1041. Alternatively, if a CT start time is detected (block 1021), the method 1002 operates by beginning transmission of the second signal at the CT start time (block 1031). This diagram shows just one example of how specific types of concurrent transmission parameters may modify and govern operation of such concurrent transmissions. Note that a concurrent transmission may be generated and made based on any other types of concurrent transmission parameters as well (e.g., modulation type, coding type, modulation coding set (MCS), power level, frame duration, frame type, interference margin level, etc. and/or any other such concurrent transmission parameter(s)).

If no CT end time is detected (block 1041), the method 1002 completes the transmission of the second signal and the method ends. Alternatively, if a CT end time is detected (block 1041), the method 1002 operates by ending transmission of the second signal at the CT end time (block 1051). As shown with respect to FIG. 4A-4C and FIG. 5A-5D show how a concurrent transmission may end at various times including those that may be specified by concurrent transmission (CT) start and/or end times.

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, frames, etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items.

As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
   a communication interface to:
      receive a first signal from a first other wireless communication device; and
      transmit a second signal to a second other wireless communication device;
   a processor configured to:
      process the first signal to determine one or more concurrent transmission parameters;
      generate the second signal based on the one or more concurrent transmission parameters and direct the communication interface to commence transmission of the second signal during receipt of the first signal;
      determine a power of the first signal;
      when the power is below a first threshold and above a second threshold, generate the second signal based on the one or more concurrent transmission parameters and direct the communication interface to commence transmission of the second signal during receipt of the first signal;
      when the power is above the first threshold, direct the communication interface to delay commencing transmission of the second signal; and
      when the power is below the second threshold, generate a third signal based on one or more other transmission parameters and direct the communication interface to commence transmission of the third signal to the second other wireless communication device.

2. The wireless communication device of claim 1 further comprising:
   a laptop computer, a tablet, a personal digital assistant, a personal computer, or a cellular telephone.

3. The wireless communication device of claim 1, wherein the processor is further configured to:
   process the first signal to determine that another signal is expected in response to the first signal; and
   direct the communication interface to commence transmission of the second signal during receipt of the first signal and not to transmit any signal during receipt of the another signal expected in response to the first signal.

4. The wireless communication device of claim 1, wherein the processor is further configured to:
   process the first signal to determine the one or more concurrent transmission parameters that includes at least one of a concurrent transmission start time or a concurrent transmission end time; and
   direct the communication interface to commence transmission of the second signal during receipt of the first signal and at least one of to begin transmission of the second signal based on the concurrent transmission start time or to end transmission of the second signal based on the concurrent transmission end time.

5. The wireless communication device of claim 1, further comprising:
   the communication interface configured, before receipt of the first signal, to:
      receive a first other signal from the first other wireless communication device; and
      commence transmission of a second other signal to the first other wireless communication device; and
   the processor configured to generate the second other signal based on analysis of the first other signal, wherein the second other signal includes one or more recommended concurrent transmission parameters.

6. The wireless communication device of claim 1 further comprising:
   the communication interface configured to receive a fourth signal from the first other wireless communication device; and
   the processor is configured to generate a fifth signal based on the one or more concurrent transmission parameters and direct the communication interface to commence transmission of the fifth signal during receipt of the fourth signal.

7. The wireless communication device of claim 1, wherein the one or more concurrent transmission parameters includes information corresponding to at least one of a modulation type, a coding type, a modulation coding set (MCS), a transmit or receive power level, a duration of the first signal, a frame type of the first signal, uplink or downlink indication, an interference margin level, a basic services set (BSS) identifier, a transmitter or receiver identifier, a number of spatial streams, a number or transmitter or receiver antennae, symbol timing and carrier frequency offset, a concurrent transmission start time, a concurrent transmission end time, or a carrier sense threshold.

8. The wireless communication device of claim 1 further comprising:
 a wireless station (STA), wherein the first other wireless communication device is an access point (AP) and the second other wireless communication device is another STA or another AP.

9. A wireless communication device comprising:
 a communication interface to:
  receive a first signal from a first other wireless communication device; and
  transmit a second signal to a second other wireless communication device;
 a processor configured to:
  process the first signal to determine a power of the first signal and to determine one or more concurrent transmission parameters that includes at least one of a concurrent transmission start time or a concurrent transmission end time;
  when the power is below a first threshold and above a second threshold, generate the second signal based on the one or more concurrent transmission parameters and direct the communication interface to commence transmission of the second signal during receipt of the first signal and based on the at least one of the concurrent transmission start time or the concurrent transmission end time;
  when the power is above the first threshold, direct the communication interface not to transmit any signal during receipt of the first signal; and
  when the power is below the second threshold, generate a third signal based on second one or more other transmission parameters and direct the communication interface to commence transmission of the third signal to the second other wireless communication device.

10. The wireless communication device of claim 9, wherein the processor is further configured to:
 process the first signal to determine that another signal is expected in response to the first signal; and
 direct the communication interface to commence transmission of the second signal during receipt of the first signal and not to transmit any signal during the another signal expected in response to the first signal.

11. The wireless communication device of claim 9 further comprising:
 the communication interface configured to receive a fourth signal from the first other wireless communication device; and
 the processor is configured to generate a fifth signal based on the one or more concurrent transmission parameters and direct the communication interface to commence transmission of the fifth signal during receipt of the fourth signal.

12. The wireless communication device of claim 9, wherein the one or more concurrent transmission parameters also includes information corresponding to at least one of a modulation type, a coding type, a modulation coding set (MCS), a transmit or receive power level, a duration of the first signal, a frame type of the first signal, uplink or downlink indication, an interference margin level, a basic services set (BSS) identifier, a transmitter or receiver identifier, a number of spatial streams, a number or transmitter or receiver antennae, symbol timing and carrier frequency offset, or a carrier sense threshold.

13. The wireless communication device of claim 9 further comprising:
 a wireless station (STA), wherein the first other wireless communication device is an access point (AP) and the second other wireless communication device is another STA or another AP.

14. A method for execution by a wireless communication device, the method comprising:
 via a communication interface of the wireless communication device, receiving a first signal from a first other wireless communication device;
 processing the first signal to determine one or more concurrent transmission parameters;
 generating a second signal based on the one or more concurrent transmission parameters;
 via the communication interface of the wireless communication device, commencing transmission of the second signal to a second other wireless communication device during receipt of the first signal;
 determining a power of the first signal;
 when the power is below a first threshold and above a second threshold:
  generating the second signal based on the one or more concurrent transmission parameters; and
  commencing transmission of the second signal during receipt of the first signal;
 when the power is above the first threshold, delaying transmission of the second signal; and
 when the power is below the second threshold:
  generating a third signal based on one or more other transmission parameters; and
  commencing transmission of the third signal to the second other wireless communication device.

15. The method of claim 14, wherein the wireless communication device includes a laptop computer, a tablet, a personal digital assistant, a personal computer, or a cellular telephone.

16. The method of claim 14 further comprising:
 processing the first signal to determine that another signal is expected in response to the first signal;
 commencing transmission of the second signal during receipt of the first signal; and
 preventing the communication interface from transmitting any signal during receipt of the another signal expected in response to the first signal.

17. The method of claim 14 further comprising:
 processing the first signal to determine the one or more concurrent transmission parameters that includes at least one of a concurrent transmission start time or a concurrent transmission end time; and performing at least one of:
 beginning transmission of the second signal during receipt of the first signal based on the concurrent transmission start time; or
 ending transmission of the second signal based on the concurrent transmission end time.

18. The method of claim 14 further comprising:
 via the communication interface of the wireless communication device, receiving a fourth signal from the first other wireless communication device;
 generating a fifth signal based on the one or more concurrent transmission parameters; and
 commencing transmission of the fifth signal during receipt of the fourth signal.

19. The method of claim 14, wherein the one or more concurrent transmission parameters includes information corresponding to at least one of a modulation type, a coding type, a modulation coding set (MCS), a transmit or receive power level, a duration of the first signal, a frame type of the first signal, uplink or downlink indication, an interference margin level, a basic services set (BSS) identifier, a transmitter or receiver identifier, a number of spatial streams, a number or transmitter or receiver antennae, symbol timing and carrier frequency offset, a concurrent transmission start time, a concurrent transmission end time, or a carrier sense threshold.

20. The method of claim 14, wherein the wireless communication device is a wireless station (STA), the first other wireless communication device is an access point (AP), and the second other wireless communication device is another STA or another AP.

\* \* \* \* \*